Dec. 4, 1951 — G. SLAYTER — 2,577,214
GLASS MAT FOR REINFORCING PLASTICS
Filed Jan. 11, 1946 — 2 SHEETS—SHEET 1
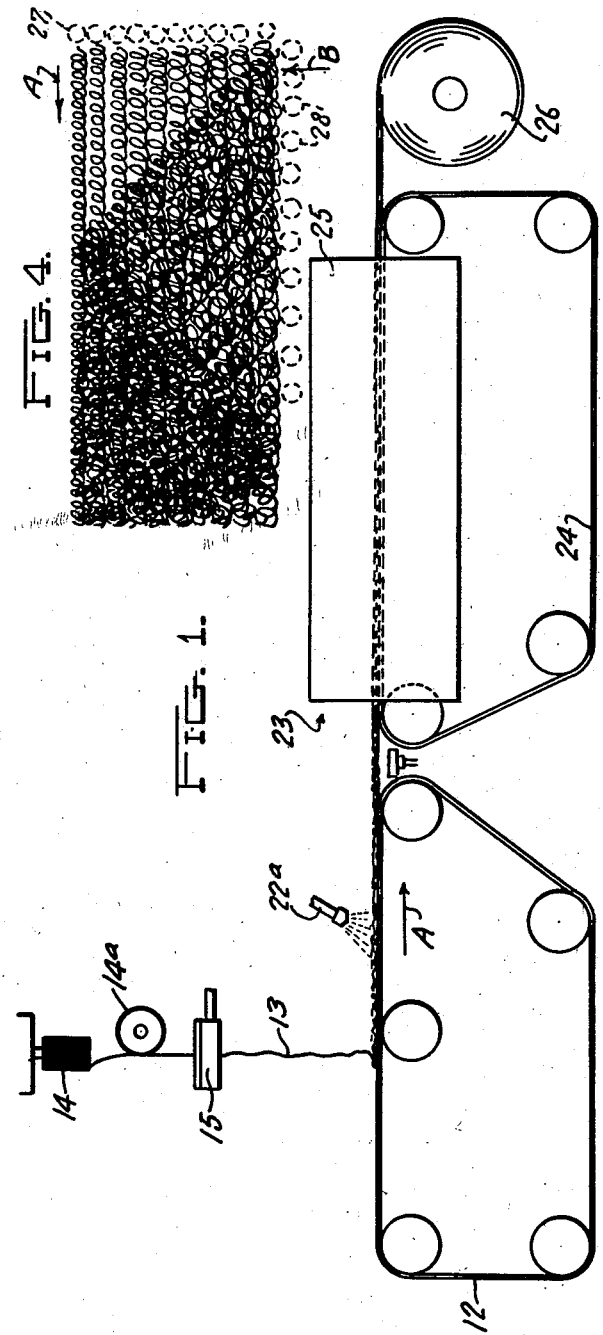
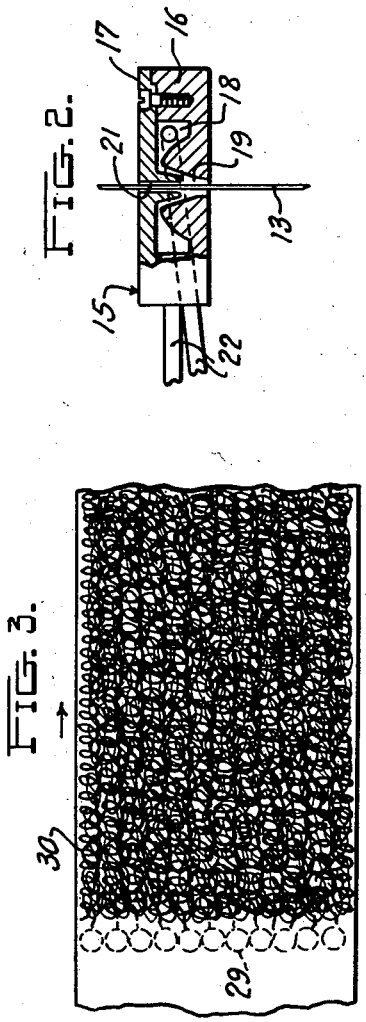
INVENTOR
Games Slayter
BY
ATTORNEYS

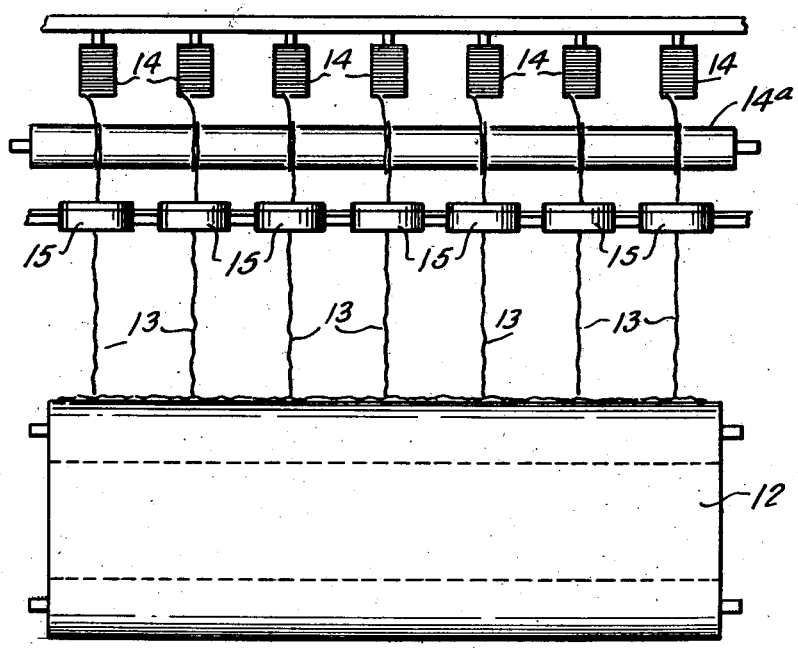
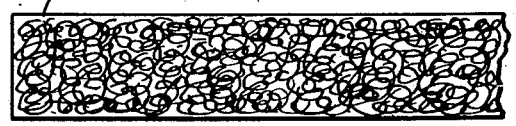
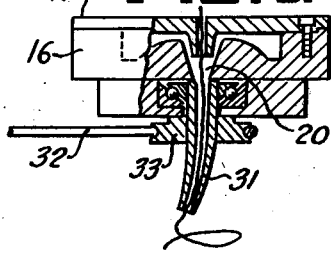

Patented Dec. 4, 1951

2,577,214

UNITED STATES PATENT OFFICE 2,577,214

GLASS MAT FOR REINFORCING PLASTICS

Games Slayter, Newark, Ohio, assignor to Owens-Corning Fiberglas Corporation, a corporation of Delaware Application January 11, 1946, Serial No. 640,565

7 Claims. (Cl. 154—46)

This invention relates to improved reinforced plastics or plastic laminates.

An object of this invention is to provide a plastic laminate having a high concentration of reinforcing glass fibers arranged in strand form to substantially increase the strength of the laminate in any selected direction or in practically all directions in the plane of the laminate, depending upon the use to which the laminate is to be put.

Another object of this invention is to provide a laminable plastic material having a fibrous glass reinforcement comprising a mass of glass fibers bonded together with the fibers extending predominantly in the direction or directions along which maximum strength is desired. This type of reinforcing sheet lends itself to more economical production than other proposed types and not only reduces the cost of manufacture of reinforced laminates to a minimum, but in addition, enables obtaining a wider variety of strength characteristics. In other words, the pattern of the fibers making up the mat may be readily controlled so that the fibers extend predominantly in any one selected direction or in practically all directions parallel to the surface planes of the mat.

A further object of the invention is to provide a fabric-like mat of glass fibers bonded together at a light density and in which the fibers are in the form of dense bundles of substantially continuous length.

A still further object of the invention is to provide a fibrous unwoven sheet as a reinforcement for plastics having a high concentration of substantially continuous fibers therein.

Still another object of this invention is to provide a plastic laminate reinforced with a fibrous glass mat of the above general type having a substantially continuous length and possessing sufficient flexibility to enable the mat to be readily rolled into package form. This arrangement facilitates and materially reduces the cost of shipping bonded fibrous glass reinforcing sheets to fabricating plants where they may be used in producing reinforced plastics or laminates for any one of a variety of purposes. Inasmuch as the resin embodied in the fibrous glass sheets is cured prior to packaging, the sheets may be packed at greater densities than uncured resin impregnated material and need not be shipped in refrigerated space.

The foregoing as well as other objects will be made more apparent as this description proceeds, especially when considered in connection with accompanying drawings, wherein:

Figure 1 is a diagrammatic side elevation of one type of apparatus for producing fibrous glass reinforcing sheets embodying this invention;

Figure 2 is a sectional view through the blower end with apparatus shown in Figure 1;

Figure 3 is a diagrammatic plan view illustrating one typical arrangement of fibers in the mat;

Figure 4 is a diagrammatic plan view illustrating another arrangement of fibers;

Figure 5 is an enlarged diagrammatic sectional view of a plastic laminate formed in accordance with this invention;

Figure 6 is a diagrammatic plan view of the sheet shown in Figure 5;

Figure 7 is a diagrammatic end view of the apparatus shown in Figure 1;

Figure 8 is a side elevation partly in section of another type of blower; and

Figure 9 is a diagrammatic elevational view of another form of mat forming apparatus.

A plastic laminate 10 embodying a fibrous mat reinforcement is diagrammatically shown in Figure 5 of the drawings in somewhat exaggerated form. This laminate may be formed of practically any of the commonly known laminating resins of the low pressure forming and curing or contact pressure types. These resins cure at temperatures of 225° F. or less and at pressures which may be only contact of one part with another. The present laminate is reinforced with an integral relatively thin mat 11 of fibrous glass. As will be presently set forth more in detail the mat 11 can be formed in considerable lengths and possesses sufficient flexibility to enable packaging the same in roll form at a density substantially higher than the normal density of the mat. Although other fibrous materials may be used, nevertheless, glass fibers are preferred, because they may be economically produced in substantially continuous lengths and possess a much higher strength-weight ratio than other types of fibers. The fibrous glass may be in the form of strands, slivers, rovings or yarns of glass fibers, which may be produced by any of the processes disclosed in the Slayter and Thomas United States Patent No. 2,133,238 dated October 11, 1938.

Regardless of the particular form of fibrous glass employed, the fibers are preferably of considerable length as such fibers impart greater strength to the mat. As will be more fully hereinafter set forth, the mat is built up with either a random or a more or less uniform arrangement of fibers, depending upon the use to which the mat is to be put. However, the pattern of the fibers is preferably controlled so that the fibers extend predominantly in the direction or directions along which maximum strength is desired, and this feature is of prime importance when using the mat as a reinforcement for thin plastic laminates. In instances where maximum strength is desired in all directions parallel to the mat, the fibers are laid in layers with the fibers in adjacent layers oriented to extend predominantly in different directions.

It has been stated above that the characteristics of the bonded fibrous glass mat is such as to enable rolling the mat into a package of higher density than exists in the actual mat. This feature greatly facilitates and reduces the cost of shipping as it enables a greater quantity of material to be accommodated in less shipping space. In addition, the necessity of using refrigerated carriers on account of the resin is avoided because the resin binder may be cured, partially cured or dried prior to packaging the mat. Furthermore, by curing or drying the resin binder prior to packaging the mat, sufficient integrity and strength is imparted to the mat to enable shipping the same in a relatively light weight carton of inexpensive paper or the like.

Mats formed in the manner of the present invention are adaptable to producing a wide variety of products. The mat is normally formed at a light density of from 1½ to 2½ pounds per cubic foot and in this form may be laminated to produce light density products such as thermal insulation or compressed to higher densities for molded articles.

It follows from the above that the material itself may not only be inexpensively produced on a production basis, but may be economically shipped to remote plants as a prefabricated sheet capable of being tailored to size for use as a reinforcement for plastics, pipe coverings, acoustical light shades, linoleum base and such other uses requiring a thin, light weight, extremely strong reinforcement. Another feature of the bonded sheets is that the thin mat has sufficient integrity to withstand the stresses of dipping or pulling through a batch of laminating resin.

The method of forming the product previously described will be more fully understood upon considering one type of apparatus suitable for carrying out the several steps of the method. The apparatus is schematically shown in several figures of the drawings and, referring particularly to Figure 1, it will be noted that the reference character 12 indicates an endless belt-type conveyor adapted to be driven by any suitable mechanism in the direction of the arrow A. The glass fibers in strand form are designated by the reference character 13 and are distributed on the conveyor 12 from a position spaced above the latter. In the present instance, the fibrous glass strands 13 are respectively packaged on spools 14 supported on any suitable frame structure (not shown) in spaced relation to each other transversely of the conveyor 12. The strands themselves may be either groups of one hundred or more individual fibers having little or no twist or they may be twisted and/or plied yarns in which form greater strength and integrity in the strand is realized.

The fibrous glass strands are removed from the spools 14 and are deposited on the conveyor 12 by circular type blowers 15 corresponding in number to the number of strands 13 and are supported in any suitable manner between the spools 14 and the top of the conveyor 12. Upon reference to Figure 2 of the drawings, it will be noted that the blowers 15 are each formed of separable sections 16 and 17. These sections cooperate with one another to form an air chamber 18 and to provide a conical chamber 19 at the center of the chamber 18. The conical chamber 19 is directed toward the discharge side of the blower and communicates with the chamber 18. The section 16 of the blower is formed with a central aperture 20 aligned with an inlet aperture 21 formed in the blower section 17. The fibrous glass strands 13 are respectively threaded through the inlet apertures 21 and discharge apertures 20 of the blowers 15 in the manner shown in Figure 2 of the drawings. Air under pressure from a suitable source of supply is introduced through a conduit 22 into the chamber 18 and is discharged through the outlet aperture 20. As the air under pressure flows out of the blower through the discharge passage 20, it envelopes the strand 13 and pulls the strand through the blower. The air pressure is, of course, sufficient to unwind the strands from the packages 14 and to project the strands downwardly onto the top of the conveyor 12. A driven feed roll 14$^a$ about which the strand is passed may be employed to provide a uniform control of the strands 13 as they are projected by the blowers onto the belt. In this way an individual blower is prevented from drawing greater amounts of strand through adjacent blowers and thus producing an uneven thickness in the mat.

The fibrous glass is deposited on the conveyor 12 in a haphazard manner to provide a mat of fibrous glass wherein the fibers cross and overlap each other. The diversity of the fibrous glass may be controlled by the relative speed of movement of the conveyor 12 and the rate at which the strands are blown through the blowers onto the conveyor.

As the mat of fibrous glass is formed on the conveyor 12, it is saturated with a suitable thermosetting resin from spray heads 22$^a$ and is conveyed through a heating zone 23 by a second endless belt-type conveyor 24. The belt-type conveyor 24 is spaced in the direction of travel of the mat from the conveyor 12 in order to enable excess resin to drain from the mat before it is introduced to the conveyor 24. If desired, heat may be applied to the underside of the mat as it is conveyed through the space between the conveyors, so as to partially cure the resin and thereby prevent the mat from adhering to the conveyor 24 while it is being advanced through the heating zone 23. The heat at the zone 23 is supplied by a suitable oven 25 and is sufficient to polymerize the thermosetting resin to a final set in a relatively short space of time.

Various thermosetting condensation products may be used as a binder, such for example, as phenol formaldehyde, urea formaldehyde, or various modifications and variations of these synthetic materials. However, for ordinary uses of the mat, it has been found that phenol formaldehyde resin is highly satisfactory when applied in solutions containing 5 to 10% solids. In general practice the finished product may comprise about 22 to 30% glass fibers and 70 to 78% resin although these amounts may vary according to the manner in which the mats are to be used. As little as 2% of resin may at times be sufficient to provide adequate handling characteristics.

Regardless of the specific thermosetting resin used in forming the mat, the latter is provided with a concentration of glass fibers which extend in a number of different directions generally parallel to the plane of the top and bottom surfaces of the mat. This is due to the fact that the fibrous glass strands are deposited at random on the conveyor 12 by the blowers 15 and this haphazard orientation of the glass fibers imparts strength to the mat in a multiplicity of directions. In actual practice, the thickness of the fibrous mat and the quantity of resin employed is determined to provide a mat having sufficient flexibility to enable rolling the mat leaving the delivery side of the conveyor 24 into a package 26 having a density substantially greater than the normal density of the mat. Thus, prefabricated bonded glass fiber mats of practically any desired length may be packaged into a relatively small space and shipped to the fabricator for incorporation in the desired product.

The preferred use for a mat embodying the present invention is to reinforce thin plastic laminates which require substantial strength in one or more specified directions parallel to the plane of the laminate. Accordingly, it is important to control the disposition of the fibrous glass on the conveyor 12 and thereby insure obtaining the fiber orientation required to give the maximum strength in the specified directions. One arrangement of the fibers which provides a mat affording substantial strength in practically all directions parallel to the mat is shown in Figure 4 of the drawings. In this figure, the reference character 27 indicates in broken lines a plurality of stationary, circular type blowers similar to the blowers 15 and supported above the conveyor 12 in spaced relation to each other transversely of the conveyor. This bank of blowers serves to lay down on the travelling belt-type conveyor a plurality of fibrous glass strands in a pattern which may at times approximate an extended spiral form extending predominantly in the direction of conveyor travel indicated by the reference character A. A second bank of blowers 28 is suspended above the conveyor 12 in spaced relation to each other in the direction of travel of the conveyor. This bank of blowers is supported by a movable framework (not shown) for movement transversely of the conveyor back and forth in the direction indicated by the arrow B in Figure 4 of the drawings. Thus, the bank of blowers 28 lays down fibrous glass strands which extend predominantly crosswise of the strands laid down by the blowers 27 and produce three distinct layers due to the movement of the conveyor. The arrangement is such that the fibrous glass strands in adjacent layers of the mat extend in different directions and impart substantial strength to the mats in corresponding directions.

Another arrangement that may be employed to provide a thin mat having substantial strength in practically all directions parallel to the mat is shown in Figure 3 of the drawings. In this figure of the drawings, the reference character 29 indicates a bank of blowers similar to the blowers 15 and supported above the conveyor 12 in spaced relation transversely of the conveyor. The bank of blowers 29 serve to lay the fibrous glass strands down on the conveyor in overlapping circular patterns indicated by the reference character 30 in Figure 3 of the drawings. For accomplishing this result, the blowers 29 are equipped with a guide 31, which extends downwardly from the discharge aperture 20 of the blower and is supported on the blower for universal movement. The arrangement is such that air under pressure flowing through the discharge opening 20 in the blower imparts a gyrating motion to the guide 31 and the latter, in turn, reacts on the fibrous glass strand to impart a helical contour to the strand. Also the guide 31 may be positively rotated by suitable means including a belt 32 passing around a pulley 33 secured to the guide. As a result, the fibrous glass strand is deposited on the conveyor 12 in the form of loops and the arrangement of the blowers is such that the loops of one strand overlap the loops of an adjacent strand. These loops are, of course, formally united together by polymerization of the thermosetting resin applied to the strands as they are built up to form the mat 11.

A still further method of producing fibrous glass mats of the general type illustrated in Figure 3 comprises the apparatus shown diagrammatically in Figure 9. As illustrated in the drawing a plurality of spools or packages of strands 35 are mounted in banks to form a creel 36 and are arranged so that the strands can be drawn through a series of guide eyes 37. In this way any desired number of single strands can be gathered together from each tier of spools. The strands drawn from the end of the spools have a natural low degree twist and readily intertwine with each other to form a single integral strand 38.

This strand 38 passes between constantly rotating feed rolls 39 and is allowed to fall at random on a moving conveyor belt 40. Due to the inherent combined twist in the strand the strand tends to form in coils on the conveyor surface with a waving or undulating motion. The tendency to coil is controlled somewhat by the distance of the feeding rolls from the conveyor and the motion is augmented by the blast from a spray head 41 by means of which binder is applied.

The creel 36 is arranged so that a plurality of strands 38 are substantially uniformly spaced across the conveyor width. This spacing is such that the coils formed from adjacent strands overlap each other at times and interlock so that when held together by the binder a single sheet of mat results. The curing of the binder then proceeds in accordance with the forms of invention previously described.

Modifications may be resorted to within the spirit of the invention and the scope of the appended claims.

What I claim as my invention is:

1. A strong, resilient, light weight porous sheet comprising fibrous glass and having substantially continuous glass fibers in the form of integral twisted strands arranged in overlapping distinctly formed loop formation extending substantially uniformly over the width and length of the mat whereby said loops intermingle with adjacent loops, and a bonding material securing said loops together.

2. A glass fiber mat comprising a sheet of fibers folded upon itself to form layers of glass fiber mat in which the fibers in each layer are in the form of continuous strands arranged substantially in rows of overlapping coils, the coils in each row overlapping adjacent rows, and the rows in each layer extending at an angle to the rows of adjacent layers.

3. A glass fiber mat comprising a sheet of fibers folded upon itself to form layers of glass fiber mat in which the fibers in each layer are in the form of continuous strands arranged in rows of overlapping coils, the coils in each row overlapping adjacent rows, and the rows in each layer extending at an angle to the rows of adjacent layers, said rows of coils extending continuously through at least two of said layers.

4. As a product of manufacture, a sheet for the reinforcement of plastics comprising substantially continuous twisted glass fiber strands disposed in a plurality of substantially parallel rows of strands with the strands in each row arranged in the form of a series of substantially distinct closed coils, the coils of each strand overlapping adjacent coils of that strand and overlapping the coils of adjacent strands, and a bonding material securing said coils together.

5. As a product of manufacture, a mat for the reinforcement of plastics comprising substantially continuous glass fibers in which the fibers are in the form of strands having a natural low twist, said strands arranged in rows of a multiplicity of overlapping loops formed by the undulating fall of said strands by gravity, said mat being folded upon itself to form layers, and a bonding material securing the strands and layers together.

6. As a product manufacture, a sheet for the reinforcement of plastics comprising a mat of substantially continuous glass fibers in which the fibers are in the form of a juxtaposed series of intertwined twisted strands, said strands forming substantially parallel rows of a multiplicity of substantially closed overlapping coils resulting from the normal tendency of the strands to form coils as they fall by gravity, and a synthetic resin bonding said coils together.

7. As a product of manufacture, a sheet for the reinforcement of plastics comprising a mat formed of a plurality of twisted strands of continuous length each disposed spirally in a series of closed loops, the loops of one strand overlapping the loops of adjacent strands to provide a substantially continuous body of strands in which the strands extend in all directions substantially in the plane of the mat, and a bonding material securing said loops together.

GAMES SLAYTER.

REFERENCES CITED

The following references are of record in the file of this patent:

UNITED STATES PATENTS

| Number | Name | Date |
|---|---|---|
| 1,315,409 | Ramsbottom | Sept. 9, 1919 |
| 1,365,061 | Respress | Jan. 11, 1921 |
| 1,478,862 | Rosenthal | Dec. 25, 1923 |
| 2,015,006 | Ekisler | Sept. 17, 1935 |
| 2,117,371 | Slayter | May 17, 1938 |
| 2,392,882 | Roberts | Jan. 15, 1946 |
| 2,429,688 | Hoover | Oct. 28, 1947 |

FOREIGN PATENTS

| Number | Country | Date |
|---|---|---|
| 17,549 | Great Britain | 1898 |